(12) United States Patent
Brooks et al.

(10) Patent No.: US 11,556,705 B2
(45) Date of Patent: Jan. 17, 2023

(54) NATURAL LANGUAGE PROCESSING PAYLOAD GENERATION

(71) Applicant: International Business Machines Corporation, Armonk, NY (US)

(72) Inventors: Alexander Brooks, Denver, CO (US); Gabriel Goodhart, Denver, CO (US); Sukriti Sharma, Denver, CO (US); Nhan Hoang, San Jose, CA (US); Jalal Mahmud, San Jose, CA (US); Gaurav Kumbhat, Tokyo (JP); Amita Misra, San Jose, CA (US); Zachary Branson, Denver, CO (US)

(73) Assignee: International Business Machines Corporation, Armonk, NY (US)

( * ) Notice: Subject to any disclaimer, the term of this patent is extended or adjusted under 35 U.S.C. 154(b) by 132 days.

(21) Appl. No.: 17/083,510

(22) Filed: Oct. 29, 2020

(65) Prior Publication Data
US 2022/0138419 A1    May 5, 2022

(51) Int. Cl.
| | |
|---|---|
| G06F 40/20 | (2020.01) |
| G06F 40/289 | (2020.01) |
| G06F 40/253 | (2020.01) |
| G06F 9/50 | (2006.01) |

(52) U.S. Cl.
CPC .......... *G06F 40/253* (2020.01); *G06F 9/5055* (2013.01); *G06F 40/289* (2020.01)

(58) Field of Classification Search
None
See application file for complete search history.

(56) References Cited

U.S. PATENT DOCUMENTS

| | | | |
|---|---|---|---|
| 7,530,107 B1 | 5/2009 | Ono et al. | |
| 8,223,788 B1 * | 7/2012 | Perelstain | H04L 49/9047 370/429 |
| 8,739,280 B2 | 5/2014 | Chess et al. | |
| 9,053,319 B2 | 6/2015 | Chess et al. | |
| 9,535,824 B2 | 1/2017 | Tripp et al. | |
| 9,760,559 B2 | 9/2017 | Dolfing et al. | |

(Continued)

OTHER PUBLICATIONS

Arcuri, A., "RESTful API Automated Test Case Generation", Jan. 6, 2019, 13 pages.
Lorenz, I, "Automatic Text Generation—a Fast and Efficient Way to Generate Customized Texts", Sep. 7, 2017, 5 pages.

(Continued)

*Primary Examiner* — Ariel Mercado
(74) *Attorney, Agent, or Firm* — James L. Olsen (57) ABSTRACT

An input text that is also transmitted to a text processing service (e.g., a cloud based text processing service) is received. Characterizing information (e.g., contiguous parts of speech, terms used per part of speech, payload length, etc.) is extracted from the input text. A text payload is generated using the characterizing information. A performance test is run on the text payload. The performance test can include performing at least one selected from a group consisting of: sentiment analysis on the text payload, entity analysis on the text payload, content classification on the text payload, and syntax analysis on the text payload. The performance test can yield a processing time required to perform the performance test. Memory and processing power resource allocation to the text processing service can be altered based on the processing time of the performance test.

13 Claims, 8 Drawing Sheets

(56) References Cited

U.S. PATENT DOCUMENTS

| | | | | |
|---|---|---|---|---|
| 9,986,394 | B1* | 5/2018 | Taylor | G06F 3/167 |
| 10,348,578 | B2 | 7/2019 | Sapozhnikov et al. | |
| 11,042,713 | B1* | 6/2021 | Platt | G06F 40/253 |
| 11,158,351 | B1* | 10/2021 | Ren | H04N 9/87 |
| 2015/0150023 | A1* | 5/2015 | Johnson | G06F 40/30 |
| | | | | 718/107 |
| 2017/0366496 | A1* | 12/2017 | Habermehl | G06Q 10/00 |
| 2019/0138649 | A1* | 5/2019 | Sullivan | G06F 40/253 |
| 2020/0117717 | A1 | 4/2020 | Ramamurti et al. | |

OTHER PUBLICATIONS

Unknown, "The Payload Generator", printed Aug. 20, 2020, 10 pages.

Shorten, C., "Generating Texts with Neural Networks", Aug. 18, 2018, 6 pages.

Testbytes, "5 Test Data Generation Techniques You Need to Know", Sep. 20, 2017, 9 pages.

Brownlee, J., "Text Generation With LSTM Recurrent Neural Networks in Python with Keras", Aug. 4, 2016, 81 pages.

De Novais et al., "Improved Text Generation using N-gram Statistics", Ibero-American Conference on Artificial Intelligence, 2010, 10 pages.

Unknown, "Hazy Product", printed Aug. 20, 2020, 5 pages.

Agirrezabal et al., "POS-tag based poetry generation with WordNet", Proceedings of the 14th European Workshop on Natural Language Generation, Aug. 2013, pp. 162-166.

Ma, E., "Data Augmentation Library for Text", Apr. 20, 2019, 10 pages.

Unknown, "Test Data Generation: What is, How to, Example, Tools", Guru99, printed Aug. 20, 2020, 9 pages.

De Groot, J., "What is the General Data Protection Regulation? Understanding & Complying with GDPR Requirements in 2019", Aug. 5, 2020, 29 pages.

Dias et al., "Automated Anonymization of Text Documents", 2016 IEEE Congress on Evolutionary Computation (CEC), Nov. 21, 2016, 8 pages.

Kleinberg et al., "NETANOS—Named entity-based Text Anonymization for Open Science", Jun. 2017, 23 pages.

Medeiros et al., "Detecting and Removing Web Application Vulnerabilities with Static Analysis and Data Mining", IEEE Transactions On Reliability, vol. 65, No. 1, Mar. 2016, pp. 54-69.

Pamies-Estrems et al., "A Real-Time Query Log Protection Method for Web Search Engines", May 21, 2020, 21 pages.

Mell et al., "The NIST Definition of Cloud Computing", Recommendations of the National Institute of Standards and Technology, Sep. 2011, 7 pages.

* cited by examiner

Frequent contiguous patterns (English sentence structures):

| Sentence Structure Patterns (in order of likelihood of occurring) |
|---|
| <noun> <verb> |
| <noun> <verb> <adjective> <noun> |
| <noun> <verb> <noun> <adverb> |

405

Frequent terms per part of speech tag (English):

| Part of Speech | Terms (in order of likelihood of occurring) |
|---|---|
| Noun | history, world, today, pattern, language, art |
| Verb | is, run, destroy, speak, hide |
| Adjective | important, large, small |
| Adverb | quickly, angrily, boldly |

410

| <noun> | <verb> | <adjective> | <noun> |
|---|---|---|---|
| History | is | important | today |
| World | run | large | pattern |
| Pattern | speak | important | language |

NATURAL LANGUAGE PROCESSING PAYLOAD GENERATION

BACKGROUND

The present disclosure relates generally to the field of natural language processing, and in particular, to natural language processing payload generation.

There is an immense amount of textual data generated daily. This data may be unstructured and may contain complex patterns as a result of differences in languages, dialects, mediums of generation, and cultural variations. Natural language processing (NLP) is a field of computer science focused on processing and understanding this textual data.

SUMMARY

Embodiments of the present disclosure are directed to a method, system, and computer program product for NLP payload generation. An input text that is also transmitted to a text processing service can be received. Characterizing information can be extracted from the input text. A text payload can be generated using the characterizing information. A performance test can be run on the text payload.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of natural language processing, and in particular, to natural language processing payload generation. While the present disclosure is not necessarily limited to such applications, various aspects of the disclosure can be appreciated through a discussion of various examples using this context.

There is an immense amount of textual data generated daily. This data may be unstructured and may contain complex patterns as a result of differences in languages, dialects, mediums of generation, and cultural variations. Natural language processing (NLP) is a field of computer science focused on processing and understanding this textual data.

To extract meaningful information from text, NLP systems often create statistical models using complex algorithms. Such systems typically require expertise to build and often have demanding computing power requirements. As a result, NLP systems are frequently offered as cloud-based services.

In a cloud setting, NLP systems are often developed using a large amount of training data. However, the training data may not represent the text patterns sent by customers of the service, which is critical as the content of the input text directly affects the quality of the analysis as well as the runtime characteristics of the NLP system. For cloud-based services, these variations in runtime performance make it difficult to understand the scalability of the underlying NLP system. That is, the lack of availability of texts at development time that collectively represent the distribution of texts seen while running in production make it difficult to gauge the performance of the underlying NLP systems accurately, especially if the NLP system supports multiple text types (e.g., multiple languages).

In general, it is not advisable to carry out testing on user data directly, as the storage and use of the customer data may violate data protection policies (e.g., general data protection regulation (GDPR)) and/or customer agreements. As such, there is a need to generate texts representative of different text types seen by the production service over different periods of time without directly storing data associated with customers in an identifiable way.

Aspects of the present disclosure relate to generating NLP text payloads. An input text can be received, for example, where the input text is also (e.g., simultaneously, contemporaneously, sequentially, previously, or subsequently) transmitted to a text processing system (e.g., a cloud based text processing service). Characterizing information which describes the text (e.g., contiguous parts of speech, terms used per part of speech, payload length, etc.) can be extracted from the input text. A text payload can be generated using the characterizing information. For example, a text payload can be generated by generating sentence structure patterns based on observed contiguous part of speech patterns (within the characterizing information) and thereafter filling terms into the sentence structure pattern based on terms associated with parts of speech (within the characterizing information). A performance test can then be run on the text payload. For example, the performance test can mirror NLP algorithms (e.g., sentiment analysis and syntax analysis) completed by a text processing system that the input text is simultaneously transmitted to. The performance test can, in some embodiments, yield a processing time required to process the text payload. This can be used for the purpose of improving NLP algorithms within one or more text processing services.

Aspects of the present disclosure provide various benefits for NLP text processing. First, by generating text payloads using characterizing information, the raw text that may include sensitive data is not actually used to test NLP algorithms. This can avoid potential issues with data protection policies and/or customer agreements. Further, by generating payloads based on text that is also transmitted to a text service, the data used to test the NLP algorithms may more closely mirror the characteristics of text that the NLP algorithms process. This allows more accurate identification of the performance of the underlying NLP algorithms.

Figure 1:
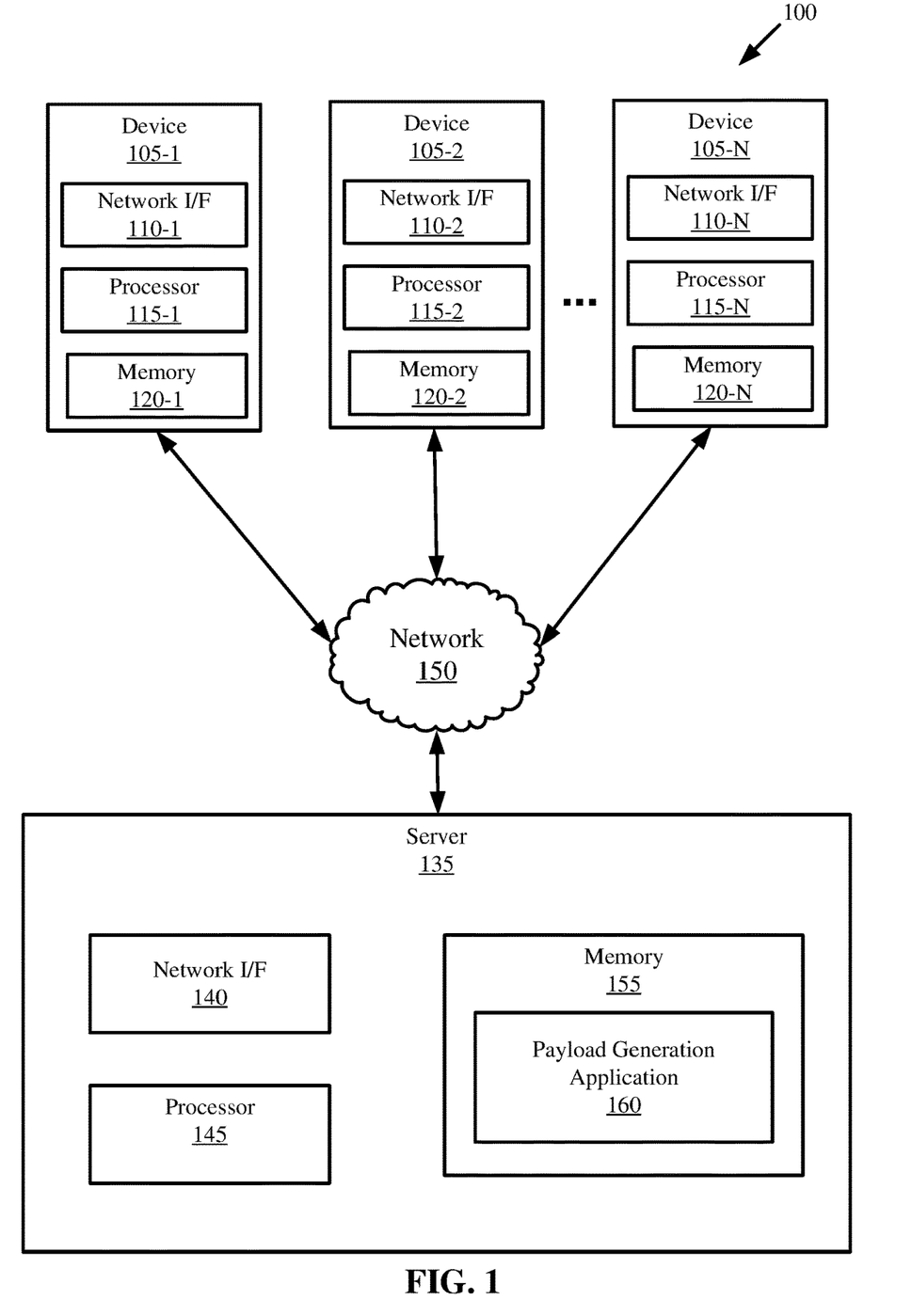
FIG. 1 is a block diagram illustrating an example computing environment in which illustrative embodiments of the present disclosure can be implemented.

Turning now to the figures, FIG. 1 is a block diagram illustrating an example computing environment 100 in which illustrative embodiments of the present disclosure can be implemented. Computing environment 100 includes a plurality of devices 105-1, 105-2 . . . 105-N (collectively devices 105), at least one server 135, and a network 150.

The devices 105 and the server 135 include one or more processors 115-1, 115-2 . . . 115-N (collectively processors 115) and 145 and one or more memories 120-1, 120-2 . . . 120-N (collectively memories 120) and 155, respectively. The devices 105 and the server 135 can be configured to communicate with each other through internal or external network interfaces 110-1, 110-2 . . . 110-N (collectively network interfaces 110) and 140. The network interfaces 110 and 140 are, in some embodiments, modems or network interface cards. The devices 105 and/or the server 135 can be equipped with a display or monitor. Additionally, the devices 105 and/or the server 135 can include optional input devices (e.g., a keyboard, mouse, scanner, a biometric scanner, video camera, or other input device), and/or any commercially available or custom software (e.g., browser software, communications software, server software, natural language processing software, search engine and/or web crawling software, image processing software, etc.). The devices 105 and/or the server 135 can be servers, desktops, laptops, financial transaction terminals, or hand-held devices.

The devices 105 and the server 135 can be distant from each other and communicate over a network 150. In some embodiments, the server 135 can be a central hub from which devices 105 can establish a communication connection, such as in a client-server networking model. Alternatively, the server 135 and devices 105 can be configured in any other suitable networking relationship (e.g., in a peer-to-peer (P2P) configuration or using any other network topology).

In some embodiments, the network 150 can be implemented using any number of any suitable communications media. For example, the network 150 can be a wide area network (WAN), a local area network (LAN), an internet, or an intranet. In certain embodiments, the devices 105 and the server 135 can be local to each other and communicate via any appropriate local communication medium. For example, the devices 105 and the server 135 can communicate using a local area network (LAN), one or more hardwire connections, a wireless link or router, or an intranet. In some embodiments, the devices 105 and the server 135 can be communicatively coupled using a combination of one or more networks and/or one or more local connections. For example, the first device 105-1 can be hardwired to the server 135 (e.g., connected with an Ethernet cable) while the second device 105-2 can communicate with the server 135 using the network 150 (e.g., over the Internet).

In some embodiments, the network 150 is implemented within a cloud computing environment or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 150. In some embodiments, the network 150 may be substantially similar to, or the same as, cloud computing environment 50 described in FIG. 6.

The server 135 includes a payload generation application 160. The payload generation application 160 can be configured to receive input text that may also be transmitted to a text processing service (e.g., a cloud-based NLP service). The payload generation application 160 can be configured to extract characterizing information from the input text. The characterizing information can include data that describes the input text, but is not necessarily the raw input text itself. For example, the characterizing information can include information such as learned parameter values associated with a text generation model (e.g., weights and biases), extracted text patterns (e.g., frequent contiguous patterns, such as part of speech patterns), payload distribution information (e.g., the distribution of payload lengths processed by the text processing service, such as word count), terms associated with parts of speech, and raw text payloads (e.g., pre-generated text payloads loaded in an "as-is" basis).

Figure 4:
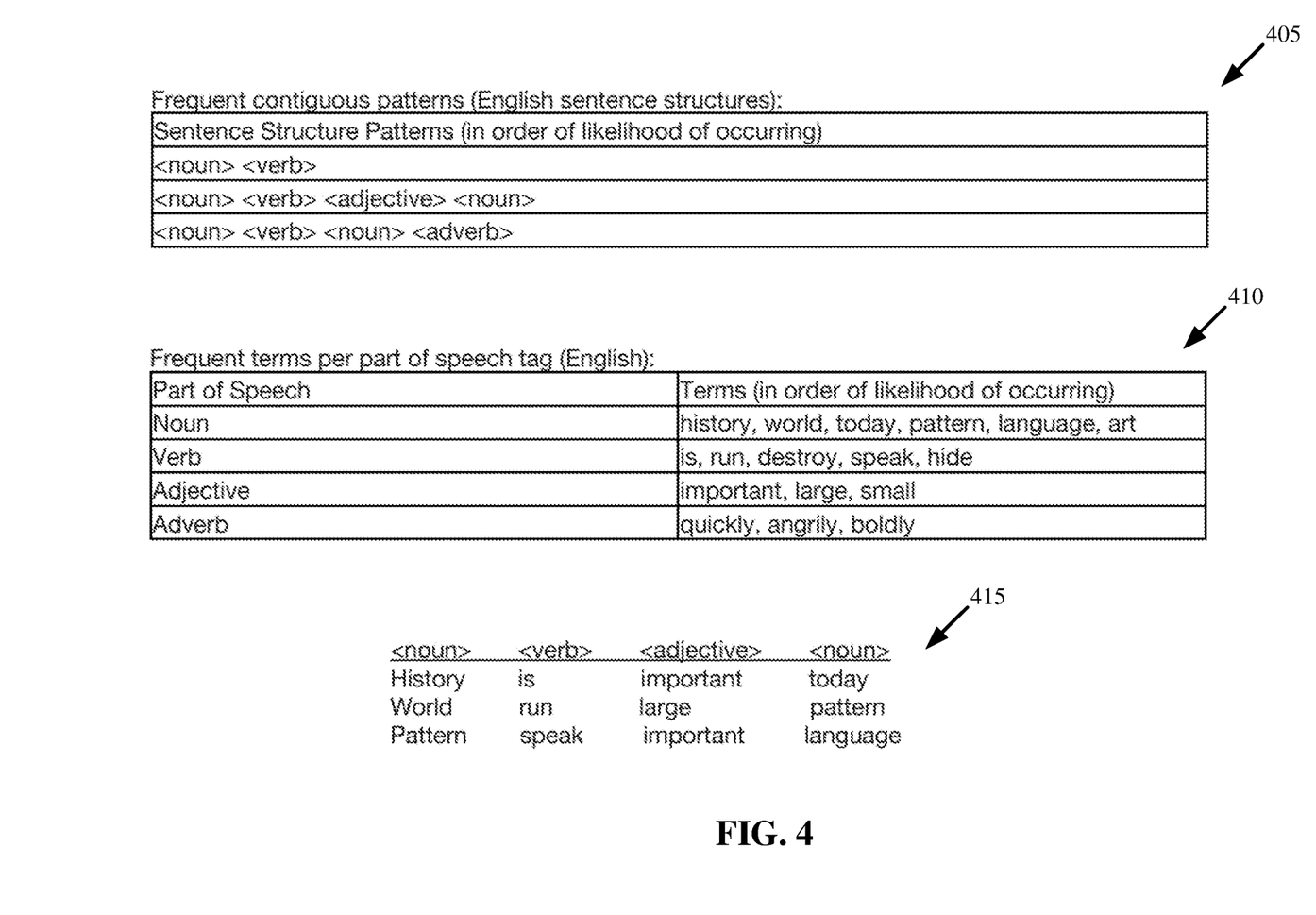
FIG. 4 is a diagram depicting a table having sentence structure patterns, a table having frequent terms per part of speech, and a table depicting the population of payloads by filling terms into a sentence structure pattern, in accordance with embodiments of the present disclosure.

Upon extracting characterizing information from the input text, the characterizing information can be stored, for example, in a distributed computing environment, such as a cloud database. Thereafter, the payload generation application 160 can be configured to access the stored characterizing information such that payloads can be generated using the characterizing information. In embodiments, the payload generation application 160 can be configured to filter the characterizing information, such that only relevant information is used for the purpose of generating payloads. Thereafter, payloads can be generated using the characterizing information. As an example, generating payloads can include creating part of speech (POS) placeholders based on frequently received contiguous part of speech patterns apparent within the characterizing information. Thereafter, the POS placeholders can be filled with terms frequently associated with each respective part of speech. This example is depicted in FIG. 4.

Upon generating the payload(s) based on the characterizing information. The payload generation application 160 can be configured to run performance test(s) for each loadable payload. This can include running the payload(s) through one or more NLP text services to receive performance metrics (e.g., required processing time) based on NLP processing. Thereafter, post-processing of the test results can be completed. This can include applying one or more data analysis techniques (e.g., cleaning, formatting, modeling, statistically analyzing, etc.) to the test results.

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary.

While FIG. 1 illustrates a computing environment 100 with a single server 135, suitable computing environments for implementing embodiments of this disclosure can include any number of servers. The various models, modules, systems, and components illustrated in FIG. 1 can exist, if at all, across a plurality of servers and devices. For example, some embodiments can include two servers. The two servers can be communicatively coupled using any suitable communications connection (e.g., using a WAN, a LAN, a wired connection, an intranet, or the Internet).

Figure 2:
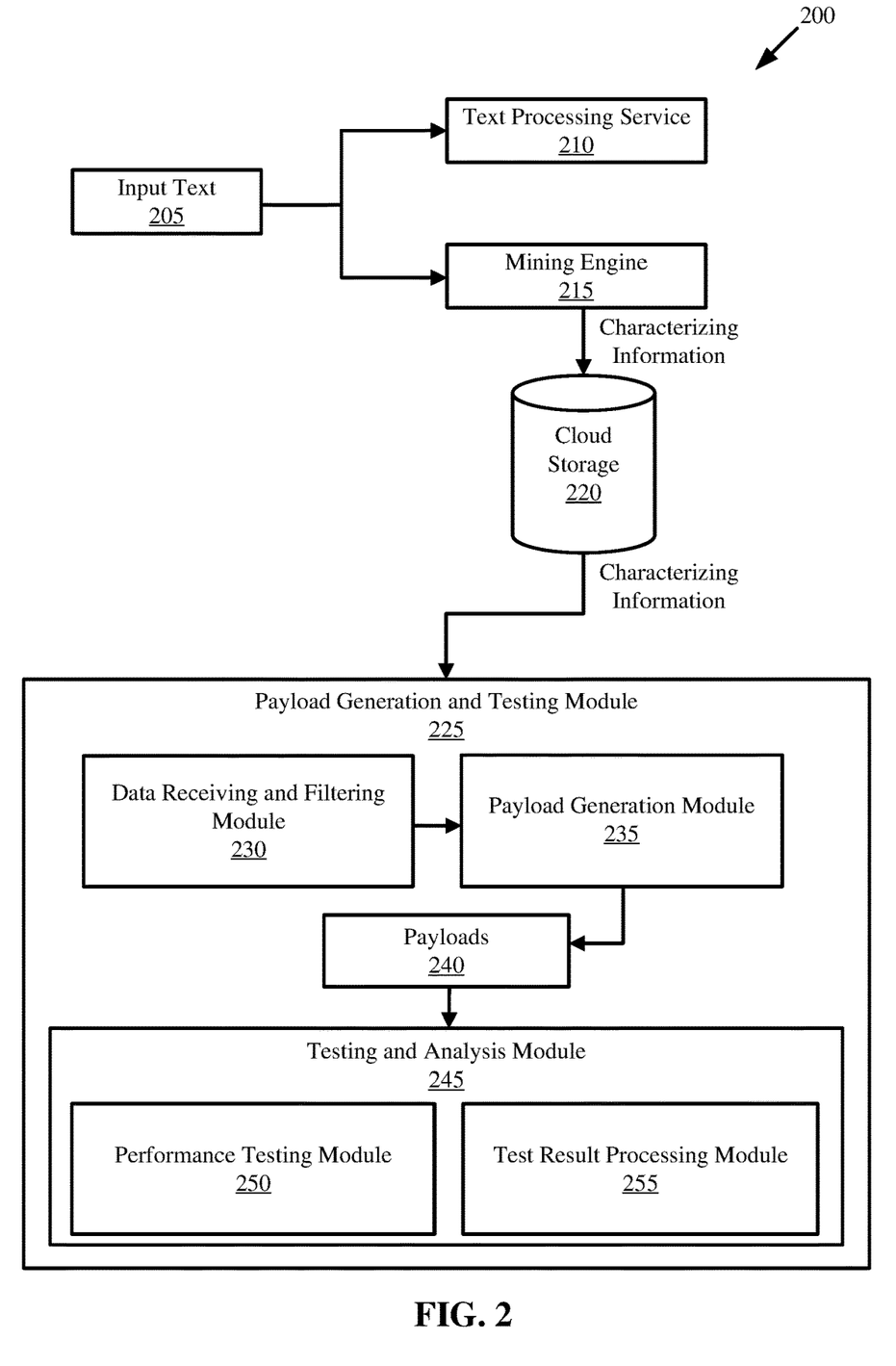
FIG. 2 is a block diagram illustrating another example computing environment in which illustrative embodiments of the present disclosure can be implemented.

Referring now to FIG. 2, shown is an example computing environment 200 in which illustrative embodiments of the present disclosure can be implemented. The computing environment 200 includes a text processing service 210, a mining engine 215, a cloud storage 220, and a payload generation and testing module 225. The various components within computing environment 200 (e.g., mining engine 215, payload generation and testing module 225, etc.) can be processor executable instructions that can be executed by a dedicated or shared processor using received inputs.

As depicted in FIG. 2, input text 205 is fed into a text processing service 210 and a mining engine 215. Any suitable input text 205 can be received, including unstructured and structured text. The input text 205 can be any suitable language, be of any suitable length (e.g., any number of pages, words, etc.), and be in any suitable format (e.g., plain text, .doc, .txt, .pdf, etc.). In embodiments, pre-processing of input text 205 can occur to streamline ingestion of input text 205 into text processing service 210 and/or mining engine 215.

The text processing service 210 can be any suitable NLP processing service configured to analyze and classify text. For example, the text processing service 210 can include software as a service (SaaS) and open source (OS) application programming interfaces (APIs) such as IBM WATSON®, GOOGLE CLOUD® NLP, Monkeylearn, Aylien, LEXALYTICS®, and others. The text processing service 210 can be configured to perform any number of functions, including, but not limited to, sentiment analysis (e.g., understanding the opinion, feeling, or attitude expressed in text), entity analysis (e.g., identifying entities within documents and labeling them by types), entity sentiment analysis, content classification (e.g., classifying text into predetermined categories), and syntax analysis (e.g., extracting tokens and sentences, identifying parts of speech, creating dependency parse trees for sentences, etc.). In embodiments, text processing service 210 can also include one or more custom models (e.g., using machine learning techniques). Further, in embodiments, the text processing services 210 can be configured to perform spatial structured understanding (e.g., using layout and structure information within formatted text documents to improve analysis). Further still, text processing service 210 can support large data sets (e.g., millions of documents) with multi-language capabilities (e.g., analyzation of text in various languages such as English, Spanish, Japanese, Chinese, French, German, Russian, etc.).

The input text 205 can be simultaneously transmitted to mining engine 215 which can be configured to extract characterizing information from the input text 205. The mining engine 215 may temporarily store input text 205 such that characterizing information describing the input text 205 can be extracted therefrom. Thereafter, the mining engine 215 may erase the input text 205 and may store the characterizing information extracted from the text in a cloud storage 220. This can be completed such that sensitive text data (e.g., received from customers) is not stored within cloud storage 220, and only data relevant for generating payloads is stored within cloud storage 220.

Characterizing information extracted from input text can include information which describes the input text 205 such as text patterns (e.g., contiguous part of speech patterns), terms used per part of speech, payload distribution information (e.g., the length of the input text 205), pre-generated text payloads (e.g., loaded in an "as-is" basis, as these may not be data received from a customer), and learned parameters from text generation models (e.g., weights and biases, sentiment values, entities, syntax information, etc.).

The characterizing information can be stored and organized within cloud storage 220 in any suitable manner. For example, characterizing information can be stored in partitions (e.g., classified and stored within portions of memory) based on input text 205 submissions, based on text type (e.g., language), based on data format, based on payload length, based on observed patterns, based on topic, and others. Data cleansing and sanitation techniques can be applied to data stored within cloud storage 220.

A data receiving and filtering module 230 of the payload generation and testing module 225 can be configured to access and receive characterizing information stored in cloud storage 220. The data receiving and filtering module 230 can further be configured to filter the characterizing information stored within cloud storage 220. For example, the data receiving and filtering module 230 can be configured to filter characterizing information based on text type (e.g., language), format, payload length, topic, and observed patterns, among others.

Figure 3:
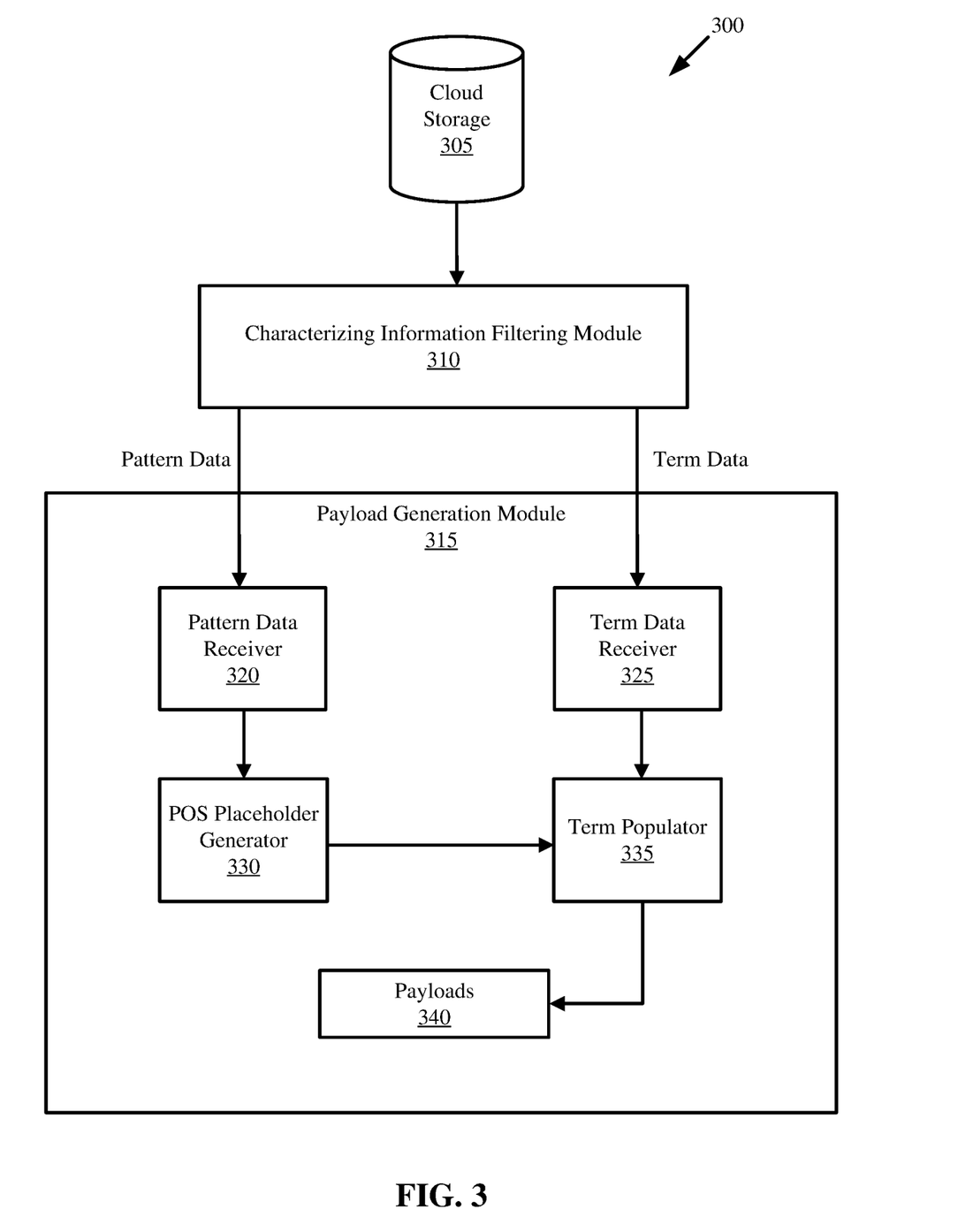
FIG. 3 is a block diagram illustrating an example computing environment including a payload generation module, in accordance with embodiments of the present disclosure.

A payload generation module 235 of the payload generation and testing module 225 can be configured to generate loadable payloads 240 using the characterizing information accessed from cloud storage 220 by the data receiving and filtering module 230. The payload generation module 235 can generate payloads 240 in any suitable manner. If the characterizing information is already formatted as pre-generated loadable payloads, then generating payloads 240 may be as simple as downloading the characterizing information including the pre-generated loadable payloads and storing this information as payloads 240. However, if the characterizing information encodes some representation (e.g., text patterns, frequently used terms per part of speech, payload lengths, etc.) of the input text, generating payloads may be more complex and involve, for example, loading a text generation model and generating a set of texts matching the text size distribution seen by the text processing service 210 over a given time interval. An example embodiment of payload generation module 235 is depicted in FIG. 3.

Upon generating payloads 240, the payloads 240 are fed into a testing and analysis module 245. The testing and analysis module 245 includes a performance testing module 250 configured to run performance tests for each loadable payload. This can include applying NLP techniques on each payload such as sentiment analysis (e.g., understanding the opinion, feeling, or attitude expressed in text), entity analysis (e.g., identifying entities within documents and labeling them by types), entity sentiment analysis, content classification (e.g., classifying text into predetermined categories), and syntax analysis (e.g., extracting tokens and sentences, identifying parts of speech, creating dependency parse trees for sentences, etc.). Further, the performance testing module 250 can be configured to determine performance metrics such as processing speed (e.g., the amount of time required to run each respective NLP analysis on the payload) associated with performing the above NLP techniques. In embodiments, the selected performance testing may mirror one or more NLP algorithms performed by the text processing service 210.

The NLP analysis as well as the associated performance metrics can then be transmitted to a test result processing module 255 of the testing and analysis module 245. The test result processing module 255 can be configured to perform data analysis techniques on the data received from the performance testing module. For example, the test result processing module 255 can be configured to aggregate test results (e.g., extract a mean value, calculate an average, min, or max), create a statistic distribution (e.g., a bell curve) using the test data, cleanse or sanitize the test data, format the test data (e.g., compile test data into a table or other format), model the data using algorithms to identify relationships within the data, and/or other forms of data analysis.

Thereafter, the analysis run on the payloads can be used to enhance the NLP algorithms integrated within the text processing service 210, for example, to reduce the amount of time required for processing input text 205 in the future. For example, having a better understanding of the performance characteristics of an NLP algorithm can be useful in determining the extent to scale the platform on which the NLP process is served (e.g., container size in a cloud environment). In embodiments, resource allocation (e.g., processing power and memory distribution) can be improved for NLP algorithms as better estimates of the actual size and characteristics of payloads are determined.

It is noted that FIG. 2 is intended to depict the representative major components of example computing environment 200. In some embodiments, however, individual components can have greater or lesser complexity than as represented in FIG. 2, components other than or in addition to those shown in FIG. 2 can be present, and the number, type, and configuration of such components can vary.

Referring now to FIG. 3, shown is a computing environment 300 including an example payload generation module 315, in accordance with embodiments of the present disclosure. The various components depicted within computing environment 300 (e.g., the characterizing information filtering module 310 and the submodules of the payload generation module 315) can be processor executable instructions that can be executed by a dedicated or shared processor using received inputs.

As discussed with respect to FIG. 2, various characterizing information of textual data can be stored in cloud storage 305 and accessed therefrom for the purpose of generating NLP payloads 340. A characterizing information filtering module 310 can be configured to filter characterizing data within the cloud storage 305 such that the filtered data can be ingested into payload generation module 315. In the embodiment depicted in FIG. 3, the characterizing information filtering module 310 filters characterizing information to receive a set of pattern data and a set of term data.

Pattern data can include contiguous part of speech (POS) patterns present within the data. In embodiments, the contiguous POS patterns can be determined on a sentence by sentence basis. However, in embodiments contiguous POS patterns can be determined on any other suitable granularity (e.g., paragraph by paragraph, page by page, etc.). Additionally, the pattern data can include the relative frequency each contiguous POS pattern is observed. Example pattern data is depicted in table 405 of FIG. 4. Term data can include terms extracted from characterizing information stored within cloud storage 305. Additionally, term data can include frequency of terms used and associated parts of speech of each respective term. Example term data is depicted in table 410 of FIG. 4.

A pattern data receiver 320 of the payload generation module 315 receives the pattern data from the characterizing information filtering module 310 and a term data receiver 325 receives the term data from the characterizing information filtering module 310. The pattern data receiver 320 forwards the pattern data to a POS placeholder generator 330, which can be configured to generate POS placeholders for respective payloads. A POS placeholder specifies a designated part of speech required to be used in a particular position within a sentence. Thus, by generating POS placeholders for payloads, the POS sentence structure of a payload can be defined. Example POS placeholder sentence structures are depicted in table 405 of FIG. 4 (e.g., <noun><verb><adjective><noun>).

Upon generating POS placeholders, the POS placeholder generator 330 forwards the POS placeholder sentence structures to a term populator 335. The term populator 335 can be configured to add terms having the designated POS into each respective placeholder within the POS placeholder sentence framework. For example, as depicted in FIG. 4, the term "History" is inserted into the placeholder <noun>, the term "is" is inserted into the placeholder <verb>, the term "important" is inserted into the placeholder <adjective>, and the term "today" is inserted into the placeholder <noun>. Thus, the POS placeholder sentence structure (e.g., <noun><verb><adjective><noun>) is received by the term populator 335 and the term populator 335 generates payloads 340 by adding terms into each placeholder (e.g., History is important today) based on the term data from the term data receiver 325.

It is noted that FIG. 3 is intended to depict the representative major components of example computing environment 300. In some embodiments, however, individual components can have greater or lesser complexity than as represented in FIG. 3, components other than or in addition to those shown in FIG. 3 can be present, and the number, type, and configuration of such components can vary. For example, the components within payload generation module 315 can vary depending on the characterizing information used to generate payloads (e.g., based on text type, payload length, etc.).

Referring now to FIG. 4, shown is a table 405 depicting example sentence structure patterns, a table 410 depicting example frequent terms per part of speech, and a table 415 depicting the generation of payloads by populating an example sentence structure pattern with terms, in accordance with embodiments of the present disclosure.

As depicted in table 405, three example sentence structure patterns are depicted (e.g., <noun><verb>, <noun><verb><adjective><noun>, and <noun><verb><noun><adverb>). Further, the table 405 is sorted from top to the bottom in order of observed frequency. This can be used when deciding the distribution of payloads to generate as well as the type of payloads to generate. For example, in some embodiments, payloads may only be generated for frequently observed sentence structure pattern (e.g., based on a threshold value). As another example, in some embodiments, the distribution of payloads can be proportional to the frequency of observed sentence structure patterns. For example, if 10% of sentences have the sentence structure pattern <noun><verb>, then 10% of payloads can be generated using the sentence structure pattern <noun><verb>. This is beneficial as the payload composition can more closely mirror sentence structure patterns fed into a text processing service.

As depicted in table 410, frequent terms per part of speech tag are depicted. The terms, on a part of speech basis, are ordered in order of frequency from left to right (under the terms column). Thus, for the POS <noun>, "history" is the most observed term. Similarly, for the POS <verb>, "is" is the most observed term. The frequency of terms can be utilized when generating payloads. For example, only frequently observed terms (e.g., terms which exceed a threshold frequency) may be incorporated into payloads. As another example, payloads may include terms proportional to the frequency of observed terms. For example, if the noun "history" is observed in 2% of noun instances, then history may be incorporated into 2% POS noun placeholders of payloads.

As depicted in table 415, example payloads are generated using the sentence structure pattern <noun><verb><adjective><noun>. In this example, the payloads are generated by filling terms within table 410 into their respective POS placeholder. Three example payloads are depicted ("History is important today," "World run large pattern," and "Pattern speak important language."). The population of terms into placeholders can vary, and may consider the frequency of terms, other terms used within the sentence, and other factors.

It is noted that the sentence structure patterns, terms per part of speech, and populated payloads depicted in tables 405-415 are merely exemplary, and any suitable sentence structure patterns, terms per part of speech, and/or populated payloads can be implemented without departing from the spirit and scope of the present disclosure.

Figure 5:
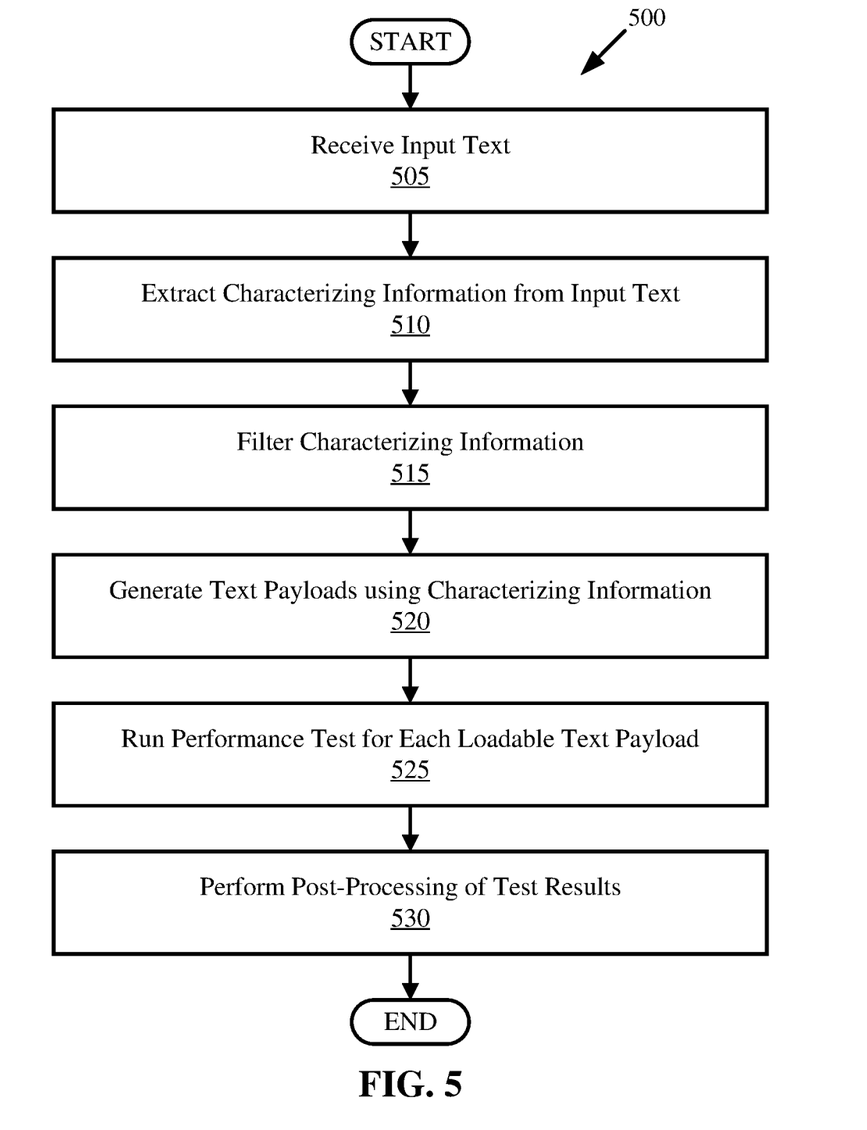
FIG. 5 is a flow-diagram depicting an example method for generating payloads based on received input text, in accordance with embodiments of the present disclosure.

Referring now to FIG. 5, shown is a flow-diagram depicting an example method 500 for generating and testing payloads based on received input text, in accordance with embodiments of the present disclosure.

Method 500 initiates at operation 505, where input text is received. The input text can be the same as, or substantially similar to, input text 205 described with respect to FIG. 2. For example, the payload size, text type, format, etc. of the input text can vary. In embodiments, the input text can be received as it is simultaneously, contemporaneously, sequentially, previously, or subsequently transmitted to a text processing service.

Characterizing information is then extracted from the input text. This is illustrated at operation 510. Characterizing information can be the same as, or substantially similar to, characterizing information described with respect to the mining engine 215 of FIG. 2 and/or the characterizing information filtering module 310 of FIG. 3. For example, characterizing information can include as text patterns (e.g., contiguous part of speech patterns), terms used per part of speech, payload distribution information (e.g., the length of the input text 205), pre-generated text payloads (e.g., loaded in as "as-is" basis, as these may not be data received from a customer), and learned parameters from text generation models (e.g., weights and biases, sentiment values, entities, syntax information, etc.).

The characterizing information is then filtered. This is illustrated at operation 515. The characterizing information can be filtered in the same as, or a substantially similar manner as described with respect to the data receiving and filtering module 230 of FIG. 2 and/or the characterizing information filtering module 310 of FIG. 3. For example, the characterizing information can be filtered based on text type (e.g., language), format, payload length, topic, and observed patterns, among others.

Text payloads are then generated using the characterizing information. This is illustrated at operation 520. Generating text payloads can be completed in the same, or a substantially similar manner, as described with respect to the payload generation module 235 of FIG. 2 and/or the payload generation module 315 of FIG. 3. For example, text payloads can be generated by generating sentence structure patterns based on observed contiguous part of speech patterns (within the characterizing information) and thereafter filling terms into the sentence structure pattern based on terms associated with parts of speech (within the characterizing information).

Performance tests are then run on each loadable text payload. This is illustrated at operation 525. Performance testing can be completed in the same, or a substantially similar manner as described with respect to the performance testing module 250 of FIG. 2. For example, performance testing can include applying NLP techniques on each payload such as sentiment analysis (e.g., understanding the opinion, feeling, or attitude expressed in text), entity analysis (e.g., identifying entities within documents and labeling them by types), entity sentiment analysis, content classification (e.g., classifying text into predetermined categories), and syntax analysis (e.g., extracting tokens and sentences, identifying parts of speech, creating dependency parse trees for sentences, etc.). Further, performance testing can include determining performance metrics such as processing speed (e.g., the amount of time required to run each respective NLP analysis on the payload) associated with performing the above-referenced NLP techniques. In embodiments, the selected performance testing may mirror one or more NLP algorithms performed by a text processing service that the input text is also transmitted to.

Post-processing of test results is then performed. This is illustrated at operation 530. Post-processing of test results can be completed in the same, or a substantially similar manner as described with respect to the test result processing module 255 of FIG. 2. For example, post-processing of test results can include aggregating test results (e.g., extract a mean value, calculate an average, min, or max), creating a statistic distribution (e.g., a bell curve) using the test data, cleansing or sanitizing the test data, formatting the test data (e.g., compile test data into a table or other format), modeling the data using algorithms to identify relationships within the data, and/or applying other forms of data analysis.

Thereafter, though not shown in FIG. 5, the test results can be used to improve one or more NLP algorithms of text processing services that the input text is transmitted to. For example, weights and biases of NLP algorithms can be adjusted based on the results received at operation 530.

The aforementioned operations can be completed in any order and are not limited to those described. Additionally, some, all, or none of the aforementioned operations can be completed, while still remaining within the spirit and scope of the present disclosure.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
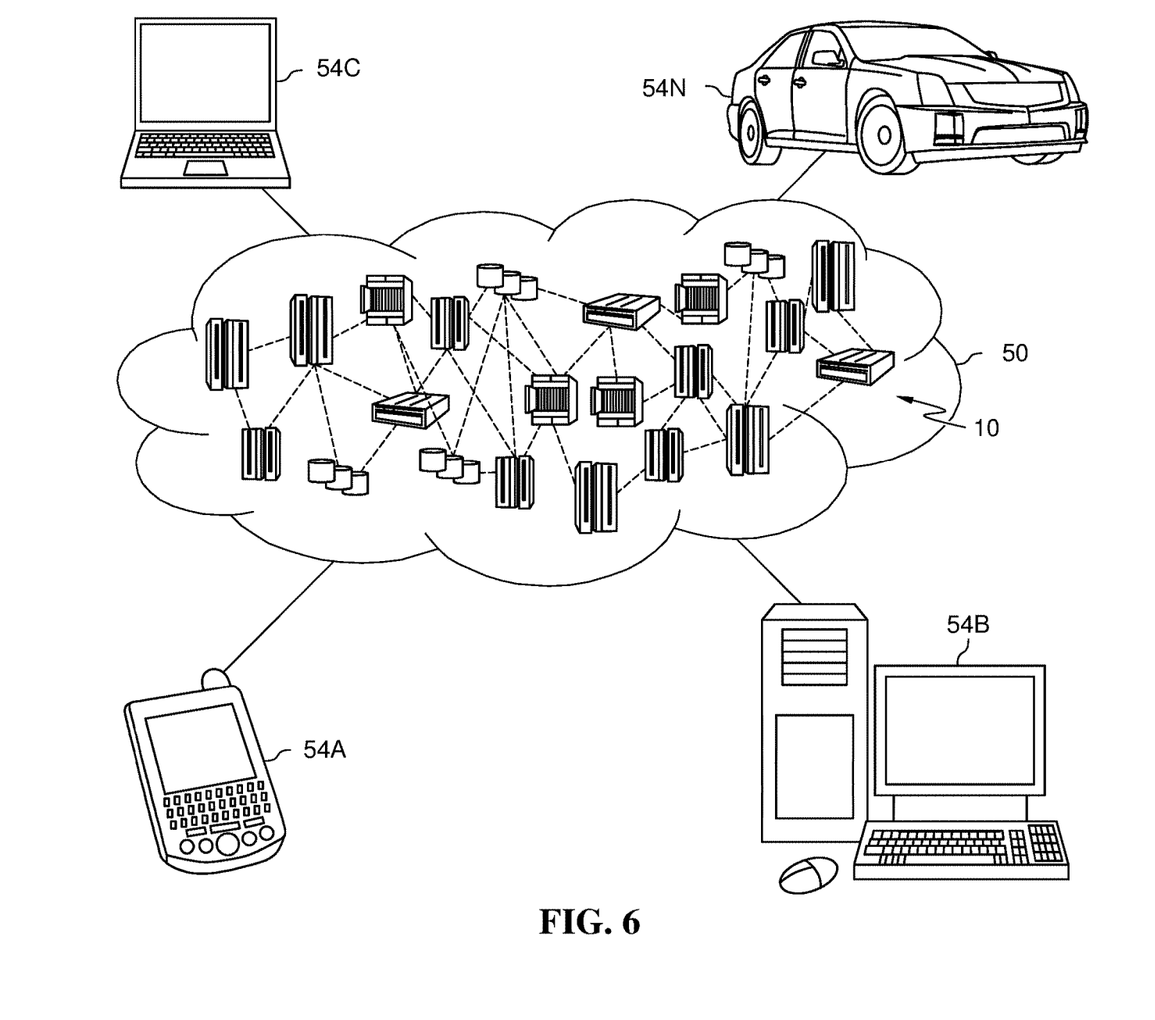
FIG. 6 is a diagram illustrating a cloud computing environment, in accordance with embodiments of the present disclosure.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A (e.g., devices 105), desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
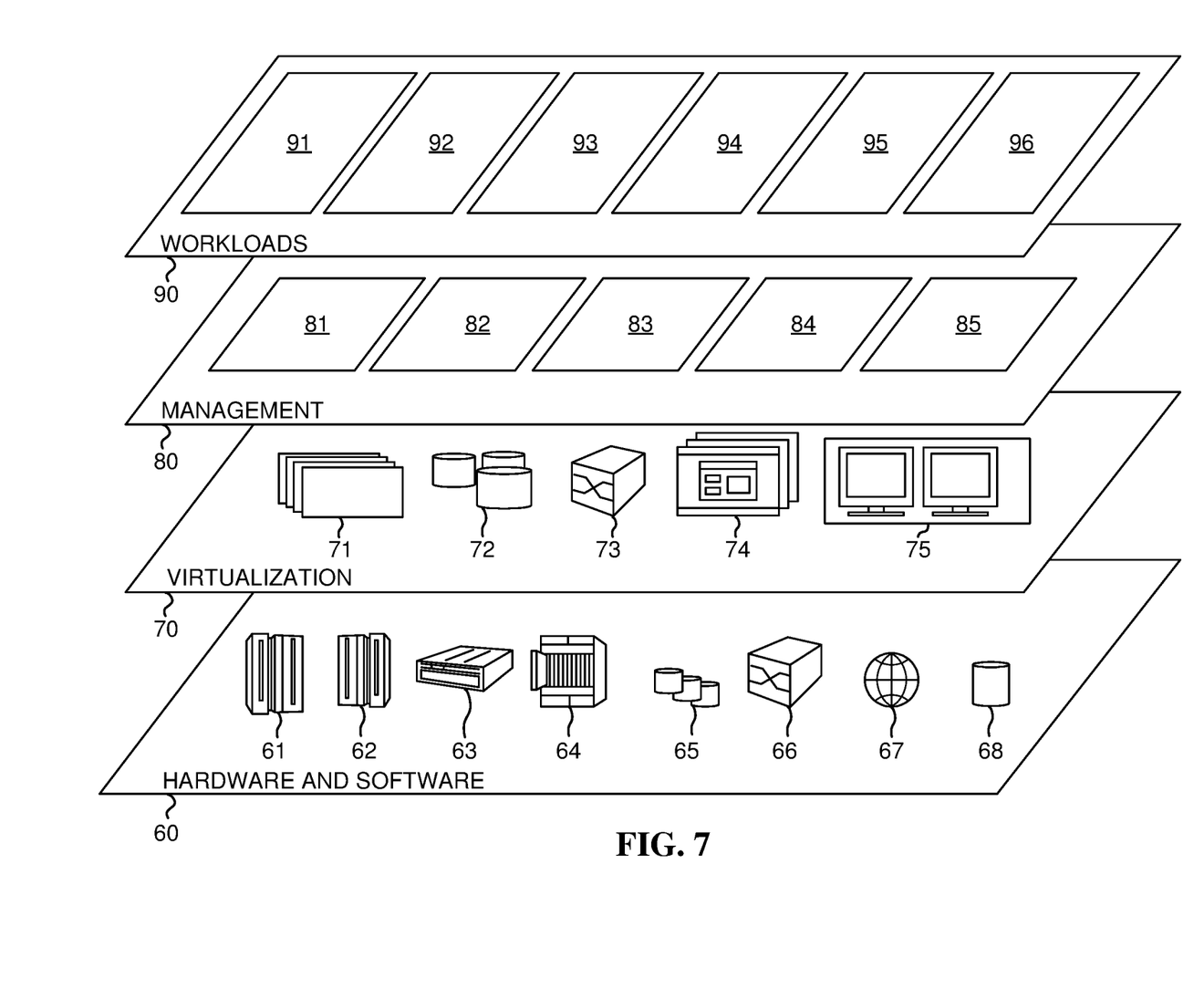
FIG. 7 is a block diagram illustrating abstraction model layers, in accordance with embodiments of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and payload generation 96.

Figure 8:
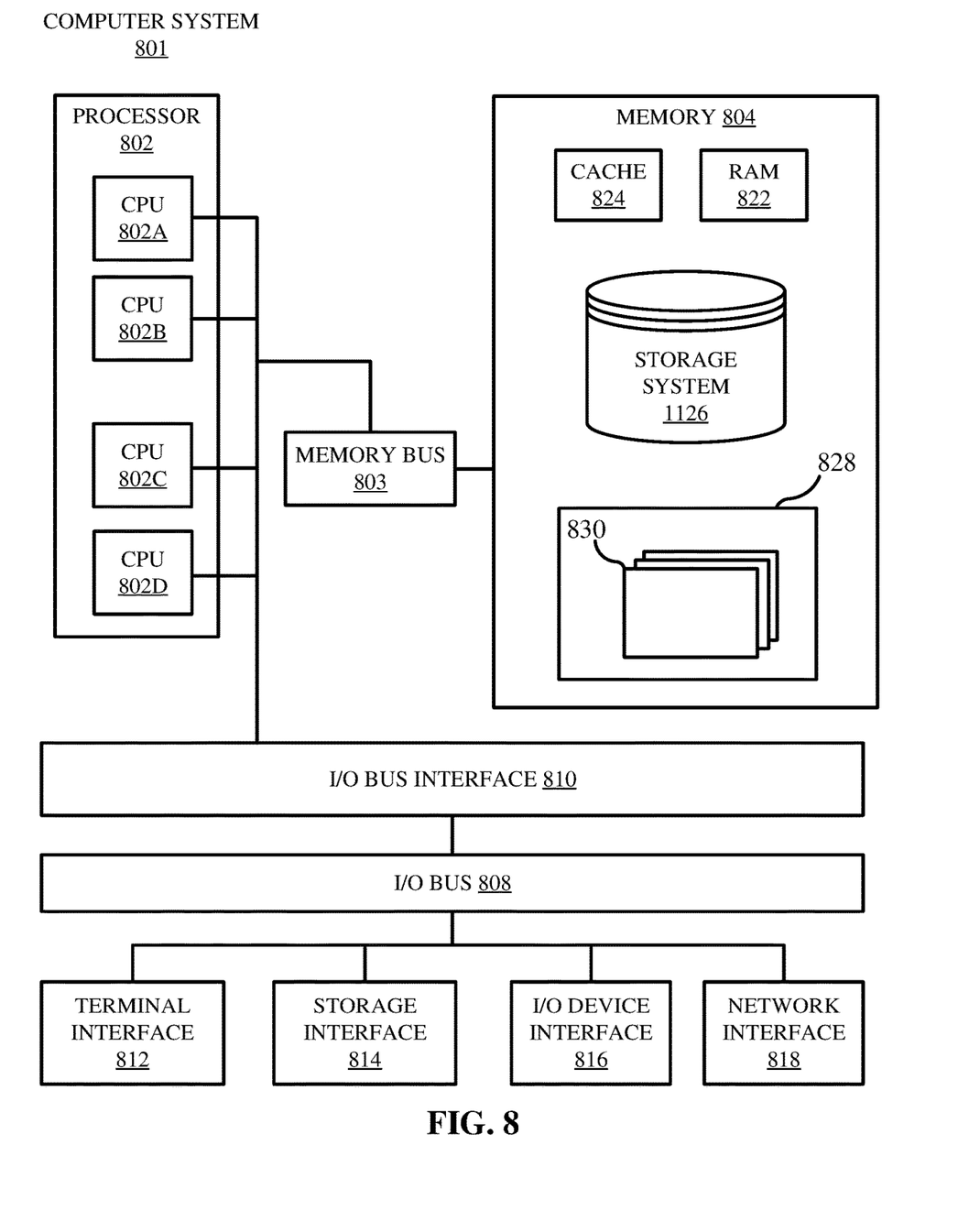
FIG. 8 is a high-level block diagram illustrating an example computer system that can be used in implementing one or more of the methods, tools, modules, and any related functions described herein, in accordance with embodiments of the present disclosure.

Referring now to FIG. 8, shown is a high-level block diagram of an example computer system 801 that may possibly be utilized in various devices discussed herein (e.g., devices 105 and server 135) and that may be used in implementing one or more of the methods, tools, and modules, and any related functions, described herein (e.g., using one or more processor circuits or computer processors of the computer), in accordance with embodiments of the present disclosure. In some embodiments, the major components of the computer system 801 may comprise one or more CPUs 802 (also referred to as processors herein), a memory 804, a terminal interface 812, a storage interface 814, an I/O (Input/Output) device interface 816, and a network interface 818, all of which may be communicatively coupled, directly or indirectly, for inter-component communication via a memory bus 803, an I/O bus 808, and an I/O bus interface unit 810.

The computer system 801 may contain one or more general-purpose programmable central processing units (CPUs) 802A, 802B, 802C, and 802D, herein generically referred to as the CPU 802. In some embodiments, the computer system 801 may contain multiple processors typical of a relatively large system; however, in other embodiments the computer system 801 may alternatively be a single CPU system. Each CPU 802 may execute instructions stored in the memory subsystem 804 and may include one or more levels of on-board cache.

Memory 804 may include computer system readable media in the form of volatile memory, such as random-access memory (RAM) 822 or cache memory 824. Computer system 801 may further include other removable/non-removable, volatile/non-volatile computer system storage media. By way of example only, storage system 826 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 804 can include flash memory, e.g., a flash memory stick drive or a flash drive. Memory devices can be connected to memory bus 803 by one or more data media interfaces. The memory 804 may include at least one program product having a set (e.g., at least one) of program modules that are configured to carry out the functions of various embodiments.

One or more programs/utilities 828, each having at least one set of program modules 830 may be stored in memory 804. The programs/utilities 828 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 828 and/or program modules 830 generally perform the functions or methodologies of various embodiments.

Although the memory bus 803 is shown in FIG. 8 as a single bus structure providing a direct communication path among the CPUs 802, the memory 804, and the I/O bus interface 810, the memory bus 803 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 810 and the I/O bus 808 are shown as single respective units, the computer system 801 may, in some embodiments, contain multiple I/O bus interface units 810, multiple I/O buses 808, or both. Further, while multiple I/O interface units are shown, which separate the I/O bus 808 from various communications paths running to the various I/O devices, in other embodiments some or all of the I/O devices may be connected directly to one or more system I/O buses.

In some embodiments, the computer system 801 may be a multi-user mainframe computer system, a single-user system, or a server computer or similar device that has little or no direct user interface, but receives requests from other computer systems (clients). Further, in some embodiments, the computer system 801 may be implemented as a desktop computer, portable computer, laptop or notebook computer, tablet computer, pocket computer, telephone, smart phone, network switches or routers, or any other appropriate type of electronic device.

It is noted that FIG. 8 is intended to depict the representative major components of an exemplary computer system 801. In some embodiments, however, individual components may have greater or lesser complexity than as represented in FIG. 8, components other than or in addition to those shown in FIG. 8 may be present, and the number, type, and configuration of such components may vary.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used, and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method comprising:
   receiving an input text that is also transmitted to a text processing service;
   extracting characterizing information from the input text;
   generating a text payload using the characterizing information;
   running a performance test on the text payload, wherein running the performance test includes performing at least one selected from a group consisting of: sentiment analysis on the text payload, entity analysis on the text payload, content classification on the text payload, and syntax analysis on the text payload, wherein the performance test yields a processing time required to perform the performance test; and
   altering memory and processing power resource allocation to the text processing service based on the processing time of the performance test.

2. The method of claim 1, wherein generating the text payload using the characterizing information includes:
   generating a sentence structure pattern based on contiguous part of speech patterns within the characterizing information; and
   filling terms into the sentence structure pattern based on parts of speech associated with respective terms.

3. The method of claim 2, wherein the generated sentence structure patterns are based on a frequency that sentence structure patterns are used as indicated in the characterizing information, and wherein the terms filled into the sentence structure patterns are based on a frequency of terms used as indicated in the characterizing information.

4. The method of claim 1, wherein characterizing information includes a language of the input text, contiguous part of speech patterns within the input text, and terms used per part of speech.

5. A system comprising:
   a memory storing program instructions; and
   a processor, wherein the processor is configured to execute the program instructions to perform a method comprising:
   receiving an input text that is also transmitted to a text processing service;
   extracting characterizing information from the input text;
   generating a text payload using the characterizing information;
   running a performance test on the text payload, wherein running the performance test includes performing at least one selected from a group consisting of: sentiment analysis on the text payload, entity analysis on the text payload, content classification on the text payload, and syntax analysis on the text payload, wherein the performance test yields a processing time required to perform the performance test; and
   altering memory and processing power resource allocation to the text processing service based on the processing time of the performance test.

6. The system of claim 5, wherein generating the text payload using the characterizing information includes:
   generating a sentence structure pattern based on contiguous part of speech patterns within the characterizing information; and
   filling terms into the sentence structure pattern based on parts of speech associated with respective terms.

7. The system of claim 6, wherein the generated sentence structure patterns are based on a frequency that sentence structure patterns are used as indicated in the characterizing information, and wherein the terms filled into the sentence structure patterns are based on a frequency of terms used as indicated in the characterizing information.

8. The system of claim 5, wherein characterizing information includes a language of the input text, contiguous part of speech patterns within the input text, and terms used per part of speech.

9. A computer program product comprising a computer readable storage medium having program instructions embodied therewith, the program instructions executable by a processor to cause the processor to perform a method comprising:
   receiving an input text that is also transmitted to a text processing service;
   extracting characterizing information from the input text;
   generating a text payload using the characterizing information;
   running a performance test on the text payload, wherein running the performance test includes performing at least one selected from a group consisting of: sentiment analysis on the text payload, entity analysis on the text payload, content classification on the text payload, and syntax analysis on the text payload, wherein the performance test yields a processing time required to perform the performance test; and altering memory and processing power resource allocation to the text processing service based on the processing time of the performance test.

10. The computer program product of claim 9, wherein generating the text payload using the characterizing information includes:

generating a sentence structure pattern based on contiguous part of speech patterns within the characterizing information; and filling terms into the sentence structure pattern based on parts of speech associated with respective terms.

11. The computer program product of claim 10, wherein the generated sentence structure patterns are based on a frequency that sentence structure patterns are used as indicated in the characterizing information, and wherein the terms filled into the sentence structure patterns are based on a frequency of terms used as indicated in the characterizing information.

12. The computer program product of claim 9, wherein characterizing information includes a language of the input text, contiguous part of speech patterns within the input text, and terms used per part of speech.

13. The computer program product of claim 9, wherein the text processing service is a cloud based application programming interface (API).

\* \* \* \* \*